(12) United States Patent
Samie et al.

(10) Patent No.: US 10,337,597 B2
(45) Date of Patent: Jul. 2, 2019

(54) ENGINE DISCONNECTS WITH MECHANICAL DIODES FOR VEHICLE POWERTRAINS

(71) Applicant: GM GLOBAL TECHNOLOGY OPERATIONS LLC, Detroit, MI (US)

(72) Inventors: Farzad Samie, Franklin, MI (US); Derek F. Lahr, Howell, MI (US); Chunhao J. Lee, Troy, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 63 days.

(21) Appl. No.: 15/587,790

(22) Filed: May 5, 2017

(65) Prior Publication Data
US 2017/0328456 A1 Nov. 16, 2017

Related U.S. Application Data

(60) Provisional application No. 62/335,910, filed on May 13, 2016.

(51) Int. Cl.
*F16H 45/02* (2006.01)
*F16D 1/104* (2006.01)
(Continued)

(52) U.S. Cl.
CPC .............. *F16H 45/02* (2013.01); *F16D 1/104* (2013.01); *F16D 3/72* (2013.01); *F16D 3/77* (2013.01);
(Continued)

(58) Field of Classification Search
CPC .... F16H 45/02; F16H 39/42; F16H 2045/002; F16H 2045/0273; F16D 41/06;
(Continued)

(56) References Cited

U.S. PATENT DOCUMENTS 2,333,680 A * 11/1943 Schneider ............... F16D 41/06
192/105 CF
4,860,861 A 8/1989 Gooch et al.
(Continued)

FOREIGN PATENT DOCUMENTS

CN 101865064 A 10/2010
CN 103228957 A 7/2013
(Continued)

OTHER PUBLICATIONS

Hybrid Powertrain System—Major Components.

*Primary Examiner* — Jacob S. Scott
*Assistant Examiner* — Lori Wu
(74) *Attorney, Agent, or Firm* — Quinn IP Law

(57) ABSTRACT

Disclosed are engine flexplates with integrated engine disconnects, methods for making and for using such flexplates, and motor vehicles with an engine flexplate having an integrated engine disconnect device. An engine flexplate assembly is disclosed for operatively coupling an engine to a hydrokinetic torque converter. The flexplate assembly includes a disk-shaped body with a central hub that rigidly attaches on the fore side thereof to the engine output shaft for common rotation therewith. A disconnect device, which is positioned on the aft side of the disk-shaped body, includes concentric inner and outer races. The outer race is rigidly attached to the disk-shaped body for common rotation therewith. The inner race rigidly attaches to the front cover of the TC housing for common rotation therewith. The disconnect device operatively disconnects the engine output shaft from the TC housing front cover when a torque transmitted therebetween reverses direction.

20 Claims, 2 Drawing Sheets

(51) Int. Cl.
*F16D 3/72* (2006.01)
*F16D 28/00* (2006.01)
*F16D 41/12* (2006.01)
*F16H 41/24* (2006.01)
*F16D 3/77* (2006.01)
*F16D 27/10* (2006.01)
*F16D 41/06* (2006.01)
*F16D 41/064* (2006.01)
*F16D 41/14* (2006.01)
*F16H 45/00* (2006.01)
*F16D 3/12* (2006.01)
*F16D 25/0638* (2006.01)

(52) U.S. Cl.
CPC ............. *F16D 27/10* (2013.01); *F16D 28/00* (2013.01); *F16D 41/06* (2013.01); *F16D 41/064* (2013.01); *F16D 41/12* (2013.01); *F16D 41/14* (2013.01); *F16H 41/24* (2013.01); *F16D 3/12* (2013.01); *F16D 25/0638* (2013.01); *F16H 2045/002* (2013.01); *F16H 2045/0273* (2013.01)

(58) Field of Classification Search
CPC ........ F16D 41/064; F16D 41/12; F16D 41/14; F16D 41/24; F16D 27/10; F16D 28/00; F16D 3/12; F16D 3/72; F16D 3/77; F16D 1/104; F16D 25/0638
See application file for complete search history.

(56) References Cited

U.S. PATENT DOCUMENTS

| | | | |
|---|---|---|---|
| 5,789,823 A * | 8/1998 | Sherman | B60K 6/26 |
| | | | 180/65.25 |
| 5,947,243 A | 9/1999 | MacDonald | |
| 6,254,507 B1 | 7/2001 | Downs | |
| 7,198,587 B2 | 4/2007 | Samie et al. | |
| 7,681,675 B2 | 3/2010 | Samie et al. | |
| 7,862,437 B2 | 1/2011 | Clark et al. | |
| 7,931,561 B2 | 4/2011 | Otanez et al. | |
| 7,980,992 B2 | 7/2011 | Sturgin | |
| 8,011,464 B2 | 9/2011 | Samie et al. | |
| 2011/0154944 A1* | 6/2011 | Mueller | B60K 6/40 |
| | | | 74/665 A |
| 2011/0168118 A1* | 7/2011 | Li | B60K 6/383 |
| | | | 123/179.25 |
| 2016/0230819 A1* | 8/2016 | Shioiri | F16D 41/14 |
| 2017/0248196 A1* | 8/2017 | Turner | F02N 11/0851 |

FOREIGN PATENT DOCUMENTS

| | | |
|---|---|---|
| EP | 0200335 A2 | 11/1986 |
| JP | 2006097888 A | 4/2006 |

* cited by examiner

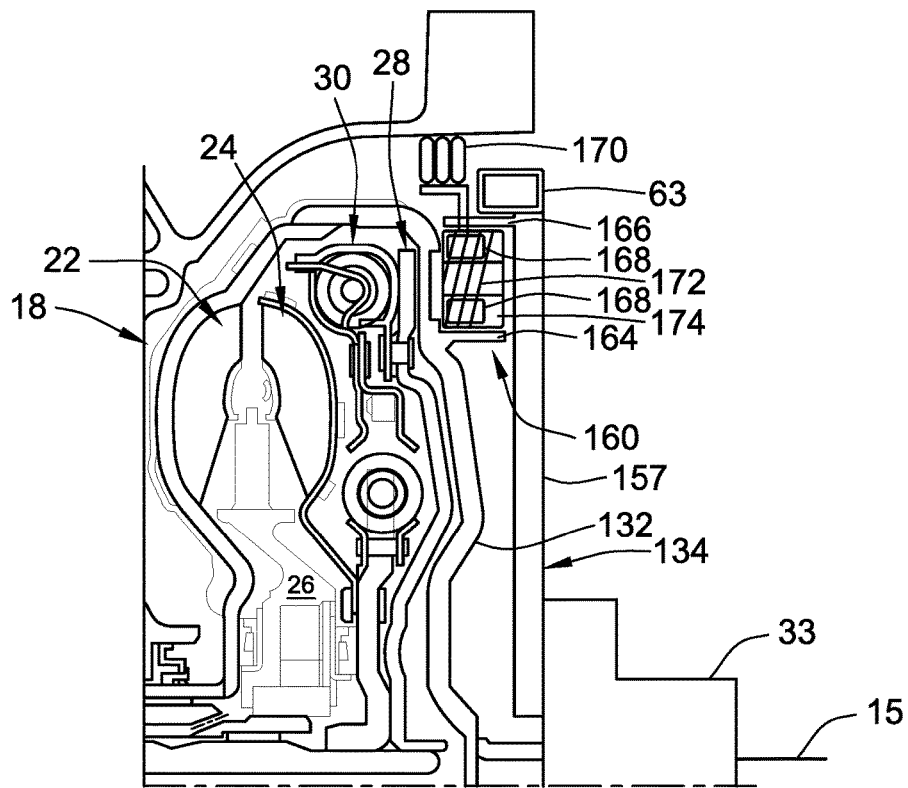
FIG. 3
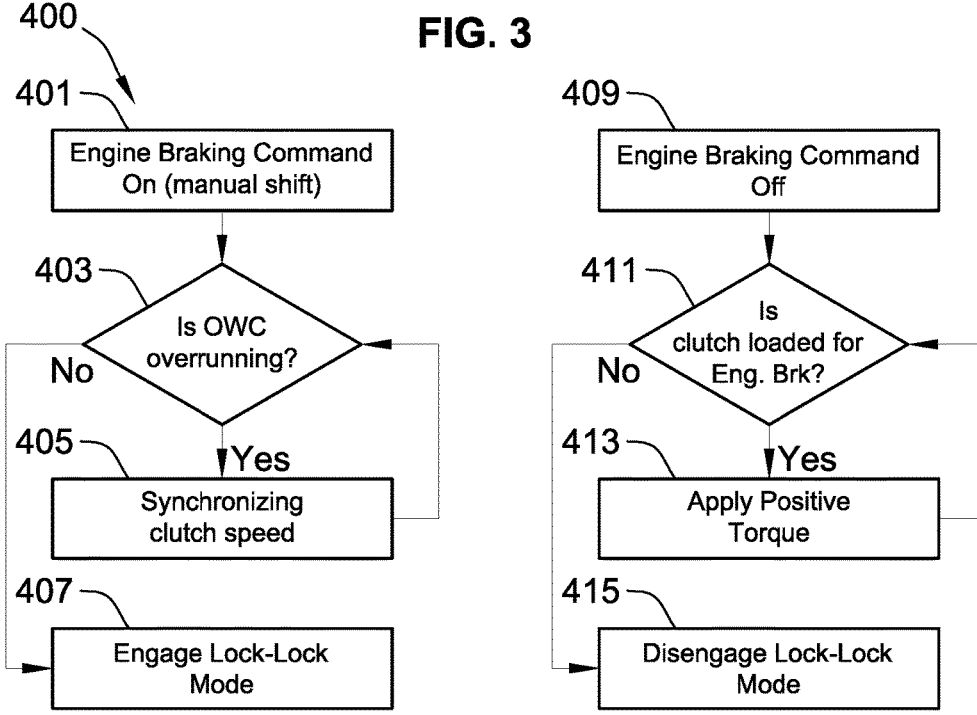
FIG. 4A FIG. 4B

ENGINE DISCONNECTS WITH MECHANICAL DIODES FOR VEHICLE POWERTRAINS

CROSS-REFERENCE AND CLAIM OF PRIORITY TO RELATED APPLICATION

This application claims the benefit of and the right of priority to U.S. Provisional Patent Application No. 62/335,910, filed on May 13, 2016, which is incorporated herein by reference in its entirety and for all purposes.

INTRODUCTION

The present disclosure relates generally to motor vehicle powertrains. More specifically, aspects of this disclosure relate to disconnect devices for operatively disengaging torque converters from internal combustion engines.

Many available motor vehicles, such as the modern-day automobile, include a powertrain that operates to propel the vehicle and power the onboard vehicle electronics. The powertrain, which is inclusive of and sometimes improperly referred to as a drivetrain, is generally comprised of an engine that delivers driving power to the vehicle's final drive system (e.g., rear differential, axle, and wheels) through a multi-speed power transmission. Automobiles have traditionally been powered by a reciprocating-piston type internal combustion engine (ICE) because of its ready availability and relatively inexpensive cost, light weight, and overall efficiency. Such engines include 2- or 4-stroke compression-ignited diesel engines and 4-stroke spark-ignited gasoline engines.

Hybrid vehicles, on the other hand, utilize alternative power sources to propel the vehicle, minimizing reliance on the engine for power and thereby increasing overall fuel economy. A hybrid electric vehicle (HEV), for example, incorporates both electric energy and chemical energy, and converts the same into mechanical power to propel the vehicle and power the vehicle systems. The HEV generally employs one or more electric machines (E-machine), such as electric motor-generators, that operate individually or in concert with an internal combustion engine to propel the vehicle. Since hybrid vehicles can derive their power from sources other than the engine, engines in hybrid vehicles can be turned off while the vehicle is propelled by the alternative power source(s).

Many motor vehicles employ a hydrodynamic torque converter disposed between the powertrain's prime mover (e.g., engine) and a driven load (e.g., multi-speed transmission) to control the transfer of rotational torque therebetween. A conventional torque converter includes an impeller that is coupled to the engine's output shaft, a turbine that is coupled to the transmission's input shaft, and a stator interposed between the impeller and turbine to regulate fluid flow between their respective fluid volumes. A hydraulic pump modulates hydraulic fluid pressure within the torque converter housing to transfer rotational energy from the impeller to the turbine. Hydraulic fluid may also be bled from the housing to increase slip or otherwise operatively disengage the engine crankshaft from the transmission input shaft and to multiply torque (e.g., function as a pseudo-reduction gear) to offset significant differences between input and output rotational speed.

A torque converter may generally be typified as a fluid coupling that allows the engine to transfer power to the final drive system for vehicle propulsion, and allows the crankshaft to spin, without the engine stalling, when the vehicle wheels and transmission gears come to a stop. For instance, if the engine is rotating slowly (e.g., when the vehicle is braking to a stop or idling at a stop light), hydraulic pressure between the pump and turbine is reduced such that the amount of torque passed through the torque converter is very small so that the vehicle may be kept still with light pressure on a brake pedal. To accelerate the vehicle, the pump increases internal fluid pressure, thereby causing increased amounts of torque to be transmitted from the impeller through the turbine to the transmission for launching the vehicle. For manual transmissions, the torque converter is typically replaced with a driver-operated clutch engaged and disengaged by a foot pedal.

Some torque converters are equipped with a clutch mechanism that is engaged to rigidly connect the engine crankshaft to the transmission input shaft when their speeds are nearly equal, e.g., to avoid unwanted slippage and resultant efficiency losses. System "slip" occurs because the rotational speed of the impeller relative to the turbine in the torque converter is inherently different. A large slip percentage between the engine output and the transmission input affects the fuel economy of the vehicle; employing a torque converter clutch (TCC) helps to reduce the slip between the engine and the transmission. The TCC operates to mechanically lock the impeller at the output of the engine to the turbine at the input of the transmission so that the engine output and transmission input rotate at the same speed. Application of the TCC may be controlled by an electronic controller to modify clutch engaging forces under certain operating conditions, for example, during shifts to eliminate undesired torque fluctuations and engine speed changes during transient periods when torque flow interruption is desired.

SUMMARY

Disclosed herein are engine flexplates with an integrated engine disconnect device, methods for making and methods for using such engine flexplates, and motor vehicles with an engine flexplate that is operatively coupled/decoupled from a hydrokinetic torque converter via an intermediate disconnect device. By way of example, and not limitation, a novel engine disconnect in the form of a passive one-way clutch (OWC) or a selectable one-way clutch (SOWC) is packaged between the torque converter (TC) housing and the engine hub, integrated with the engine flexplate. When in the form of a passive OWC or a SOWC, an annular inner race thereof is rigidly secured for common rotation with the front cover of the TC housing while an annular outer race is rigidly secured for common rotation with the engine flex plate. This configuration allows the crankshaft, by way of the flexplate, to automatically or selectively overrun the TC main shaft to prevent inadvertent engine stall. An engine starter can be placed at the outer periphery of the flexplate to selectively drive the engine crankshaft for engine startup. Some system architectures allow the torque converter to float to accommodate ballooning, while some implementations require that any ballooning motion be taken up by the one-way clutch mechanism.

Attendant benefits for at least some of the disclosed concepts include improved engine disconnect capabilities for hybrid vehicles during coasting and electric vehicle (EV) operating modes. These features are most effective for, but certainly not limited to, P2/P2.5/P3/P4 hybrid electric architectures (P2=E-machine on transmission input side; P2.5=E-machine on transmission; P3=E-machine on transmission output side; P4=E-machine direct connect to axel drive).

With the proposed system architecture and control methodology, increased fuel economy and extended EV range is realized with minimal additional cost and powertrain packaging space.

Aspects of the present disclosure are directed to engine disconnect devices for motor vehicle powertrains. Disclosed, for example, is an engine flexplate assembly for operatively coupling and decoupling an engine to/from a hydrokinetic torque converter of a motor vehicle. The engine has an engine output shaft, while the torque converter has a torque converter (TC) housing with a front cover. The engine flexplate assembly includes a disk-shaped flexplate body, with fore and aft sides, and a central hub configured to rigidly attach on the fore side thereof to the engine output shaft, e.g., via the engine hub, for common rotation therewith. A disconnect device is positioned on the aft side of the disk-shaped body and includes concentric inner and outer races. The outer race is rigidly attached to the disk-shaped body for common rotation therewith. The inner race, in contrast, is configured to rigidly attach to the front cover of the TC housing for common rotation therewith. Alternative configurations may integrally form or otherwise rigidly attach the outer race to the TC front cover and the inner race to the flexplate body. This disconnect device is configured to operatively disconnect the engine output shaft from the front cover of the TC housing when a torque transmitted therebetween reverses direction.

Other aspects of the present disclosure are directed to motor vehicles with engine disconnect devices. A "motor vehicle," as used herein, may include any relevant vehicle platform, such as passenger vehicles (internal combustion engine (ICE), hybrid, electric, fuel cell, etc.), commercial vehicles, industrial vehicles, tracked vehicles, all-terrain vehicles (ATV), farm equipment, boats, airplanes, etc. In one example, a motor vehicle is disclosed that includes a vehicle powertrain with an internal combustion engine operatively coupled to a final drive system via a multi-speed power transmission. A torque converter assembly operatively connects the internal combustion engine output shaft with the power transmission input shaft. This torque converter assembly has a torque converter (TC) housing with a front cover that is connected to a pump cover to cooperatively define an internal fluid chamber. Disposed within this fluid chamber are rotatable turbine blades juxtaposed with rotatable impeller blades.

The vehicle powertrain also includes an engine flexplate with a disk-shaped body. The flexplate's disk-shaped body has a central hub that is rigidly attached on the fore side thereof to an engine hub for common rotation with the engine output shaft. A disconnect device is interposed between the engine flexplate and the torque converter. The disconnect device includes a mechanical diode with concentric inner and outer annular races. The outer annular race is rigidly coupled to the disk-shaped body of the engine flexplate assembly for common rotation therewith. The inner annular race, in contrast, is rigidly coupled to the front cover of the TC housing for common rotation therewith. The disconnect device is configured to overrun and thereby operatively disconnect the engine output shaft from the front cover of the TC housing when a torque transmitted therebetween reverses direction.

According to other aspects of the present disclosure, methods of making and methods of using motor engine disconnect devices with mechanical diodes are presented. For instance, a method is disclosed for constructing an engine flexplate assembly for operatively coupling an engine to a hydrokinetic torque converter of a motor vehicle. The method includes: forming a disk-shaped flexplate body with fore and aft sides and a central hub that is configured to attach on the fore side thereof to the engine output shaft for common rotation therewith; positioning a disconnect device on the aft side of the disk-shaped body, the disconnect device including concentric inner and outer races, the inner race being configured to attach to the front cover of the TC housing for common rotation therewith; and attaching the outer race to the disk-shaped body for common rotation therewith. The disconnect device, when properly assembled, is configured to operatively disconnect the engine output shaft from the front cover of the TC housing when a torque transmitted therebetween reverses direction. The attaching step may comprise integrally forming the outer race with the flexplate body. In the same vein, the inner race may be integrally formed with the TC housing's front cover. Alternative configurations may include attaching the disconnect device's inner race to the flexplate body, and fabricating the outer race to rigidly attach to the TC housing front cover.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

FIG. 3 is a cross-sectional side-view illustration of a portion of the power transmission of FIG. 1 showing a representative flexplate assembly with another integrated engine disconnect device in accordance with aspects of the present disclosure.

FIGS. 4A and 4B are workflow block diagrams for a method or algorithm that may correspond to instructions executed by engine-logic circuitry of an onboard electronic engine controller for operating a controllable engine disconnect device in accordance with aspects of the present disclosure.

Figure 1:
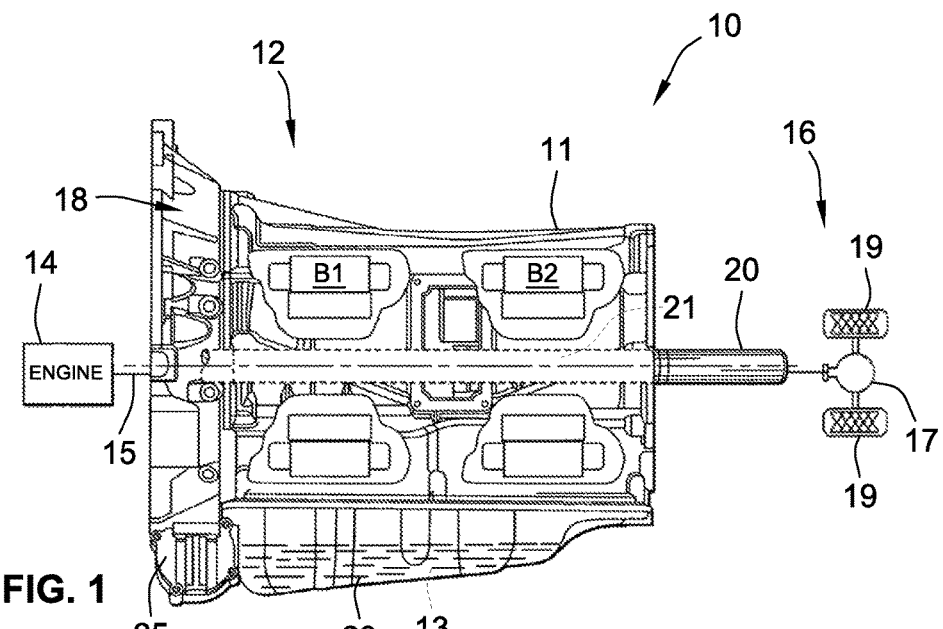
FIG. 1 is a schematic illustration of a representative motor vehicle with a powertrain having a final drive system drivingly connected to an engine by a power transmission in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms disclosed. Rather, the disclosure is to cover all modifications, equivalents, combinations, subcombinations, and alternatives falling within the spirit and scope of the disclosure as defined by the appended claims.

DETAILED DESCRIPTION OF THE ILLUSTRATED EMBODIMENTS

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a schematic illustration of a representative automobile, designated generally at 10, with a P3 hybrid-electric powertrain configuration. The illustrated automobile 10—also referred to herein as "motor vehicle" or "vehicle" for short—is merely an exemplary application with which the novel aspects of this disclosure can be practiced. In the same vein, the implementation of the present concepts into a P3 hybrid electric architecture should also be appreciated as an exemplary application of the novel concepts disclosed herein. As such, it will be understood that the aspects and features of the present disclosure can be incorporated into other vehicle powertrain configurations and utilized for any logically relevant type of motor vehicle. Lastly, the hybrid powertrain architecture shown in FIG. 1 hereof has been greatly simplified, it being understood that further information regarding the standard construction and operation of a hybrid vehicle is known.

The exemplary vehicle powertrain system is shown in FIG. 1 with a restartable engine 14 that is drivingly connected to a final drive system 16 by a multi-speed power transmission 12. The engine 14 transfers power, preferably by way of torque through an engine crankshaft 15, to an input side of the transmission 12. The transmission 12, in turn, is adapted to manipulate and distribute power from the engine 14 to the final drive system 16, represented herein by a differential 17 and a pair of drive wheels 19, and thereby propel the hybrid vehicle. In the example depicted in FIG. 1, the engine 14 may be any now known or hereinafter developed engine, such as a 2-stroke or 4-stroke diesel or a 4-stroke gasoline engine, which is readily adapted to provide its available power output typically at a number of revolutions per minute (RPM). Although not explicitly portrayed in FIG. 1, it should be appreciated that the final drive system 16 may comprise any known configuration, e.g., front wheel drive (FWD), rear wheel drive (RWD), four-wheel drive (4WD), all-wheel drive (AWD), etc.

FIG. 1 also displays selected components of the electro-hydraulic transmission 12, including a main housing 11 that encases first and second electric motor/generator assemblies B1 and B2, respectively. These motor/generators B1, B2 can be indirectly journaled onto a main shaft 21 of the transmission 12, preferably through a series of planetary gear sets (not shown). The motor/generators B1, B2 operate with one or more selectively engageable torque transmitting mechanisms (e.g., clutch, brake, etc., not shown herein) to rotate the transmission output shaft 20. An oil pan or sump volume 23 is located on the base of the main housing 11, and is configured to provide hydraulic fluid, such as transmission oil (shown hidden in FIG. 1 at 13) for the transmission 12 and its components. The main housing 11 covers the innermost components of the transmission 12, such as the motor/generators B1, B2, planetary gear arrangements, main shaft 21, and torque transmitting devices (all of which are mentioned for explanatory purposes and not all are shown). Additionally, an auxiliary pump 25 is mounted to the base of the input housing 11, and secured nestably adjacent the oil pan 23. Finally, a hydrodynamic torque converter assembly, identified generally as 18, is operatively positioned between the engine 14 and transmission 12.

Figure 2:
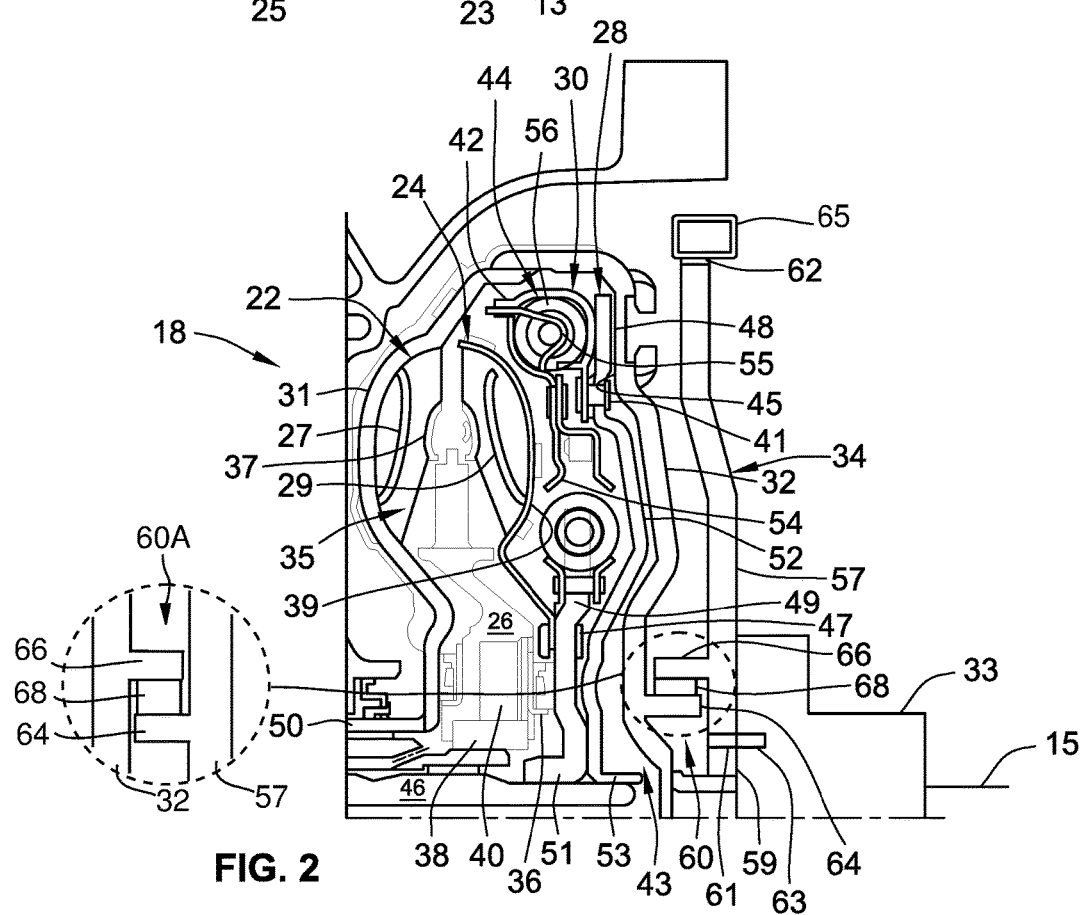
FIG. 2 is a cross-sectional side-view illustration of a portion of the power transmission of FIG. 1 showing a representative flexplate assembly with an integrated engine disconnect device in accordance with aspects of the present disclosure.

FIG. 2 is a cross-sectional side-view illustration of a portion of the representative torque converter assembly 18. Hydrokinetic torque converter assembly 18 is a fluid coupling for operatively connecting the ICE 14 with the epicyclic gearing of the power transmission 12. The torque converter assembly 18 includes a torque converter impeller 22, a bladed turbine 24, a stator 26, a lockup or bypass clutch 28, and a torsional damper assembly 30. To protect these components, the torque converter assembly 18 is constructed with an annular housing, defined principally by a pump shell portion 31 fixedly attached, e.g., via electron beam welding, MIG or MAG welding, laser welding, and the like, to an engine-side, front cover 32 such that a working hydraulic fluid chamber 35 is formed therebetween. An engine flexplate 34 is connected to the TC housing front cover 32, e.g., via one-way clutch 60, to drivingly connect the torque converter assembly 18 to the engine's 14 crankshaft 15—by way of engine hub 33—such that rotational power is transferable back-and-forth therebetween.

The impeller 22, also referred to in the art as "pump," is situated in serial power-flow fluid communication with the turbine 24. Interposed between the impeller 22 and turbine 24 is a stator 26 that selectively alters fluid flow returning from the turbine 24 to the impeller 22 such that returning fluid aids, rather than impedes, rotation of the impeller 22. The transfer of engine torque from the crankshaft 15 to the turbine 24, via the annular housing front cover 32 and impeller 22, is through the operation of hydraulic fluid, such as transmission oil 13, in the fluid chamber 35. More specifically, rotation of the impeller blades 27, retained between the pump shell 31 and an inner shroud 37, causes the hydraulic fluid 13 to be directed toroidally outward toward the turbine 24. When this occurs with sufficient force to overcome the inertial resistance to rotation, the turbine blades 29, which are coaxially oriented with the impeller blades 27 and retained between the inner shroud 37 and a turbine shell 39, begin to rotate with the impeller 22. The fluid flow exiting the turbine 24 is directed back into the impeller 22 by way of the stator 26. The stator 26, located between the flow exit section of the turbine 24 and the flow entrance section of the impeller 22, redirects the fluid flow from the turbine 24 to the impeller 22 in the same direction as impeller rotation, thereby reducing pump torque and causing torque multiplication.

Also disposed within the housing of the torque converter assembly 18 is a pair of thrust bearings 36 that rotatably supports the stator 26. The stator 26 is connected to a stator shaft 38 by way of a roller clutch 40 that is operable to prevent rotation of the stator 26 at low torque converter speeds. At higher torque converter speeds, the direction of hydraulic fluid 13 leaving the turbine 24 changes, causing the stator 26 to over-run the roller clutch 40 and rotate freely on the stator shaft 38. The impeller 22 is secured to a pump hub 50, whereas the turbine 24 is rotatably mounted onto a TC output shaft 46. As shown, a turbine hub 49 is disposed between, and configured to operatively couple together, the turbine 24 and the TC output shaft 46. The turbine hub 49 is secured to the turbine shell 39, for example, by a plurality of rivets 47, and engages the TC output shaft 46, for example, by a splined interface 51.

Fundamentally, as the internal combustion engine 14 operates at different rotational speeds it may produce torsional vibrations (colloquially known as "torsionals"). By way of example, when fuel is being fed to the engine 14 and it is under power, e.g., through engagement of the fuel throttle (not shown herein) during normal operation, the engine 14 may produce torsionals that are undesirable to transmit to, and through the transmission 12. In addition, when the engine 14 is not being fueled or is not under power (e.g., in a startup and/or a shutdown operation) the engine pistons may generate compression pulses. Both the torsionals and compression pulses can produce resultant vibrations and noise that may be sensed by a vehicle occupant.

To cancel out the torsionals and compression pulses that may be produced by the engine 14, the torque converter assembly 18 is equipped with a torsional damper assembly 30, as shown in FIG. 2. As will be described in detail below, the torsional damper assembly 30 generally functions to isolate the transmission 12 from unwanted torsionals generated by the engine 14 during operation and also to selectively aide the one or more motor/generator assemblies in canceling engine compression pulses during startup and shutdown operations.

The torsional damper assembly 30 includes an annular damper flange 42, having one or more spring-mass damper systems, referred to hereinafter as "SDS" and identified generally as 44, spaced circumferentially around and positioned proximate to its outer periphery. The damper flange 42 is rigidly coupled to a clutch plate 52 of lockup clutch 28 via a rivet 41 or secured thereto by means of soldering, mechanical fastener, forming, etc. The engine-side front cover 32 is affixed, as described above, to the engine crankshaft 15 by way of the interconnection between the flexplate 34 to a crankshaft pilot (not shown). In addition to operating to transmit torque produced by the engine 14 to the transmission 12, the flexplate 34 also functions to absorb thrust loads that may be generated by the torque converter 18 hydrodynamics and/or through operation of the lockup clutch 28.

Located inside a fluid cavity 43 adjacent the turbine shell 39 is a lockup clutch 28 (also referred to herein as torque converter clutch (TCC)) to provide a direct driving connection between the engine 14 and transmission 12. The lockup clutch 28 comprises a clutch plate 52 that is operable to selectively frictionally engage a friction surface or friction material 48 with an inner contact surface 45 of the front cover 32. The clutch plate 52 is slidably supported at an annular clutch hub portion 53 thereof on a proximal end of the TC output shaft 46. For at least some configurations, the clutch plate 52 moves in response to hydraulic fluid, i.e., transmission oil 13, fed into fluid cavity 43 from an oil source, such as sump volume 23. When the lockup clutch 28 is fully engaged (i.e., when there is no slip between the friction material 48 and surface 45 of the front cover 32) the impeller 22 is frictionally coupled to the turbine 24 such that the two components rotate as a single unit, allowing the engine 14 to effectively circumvent the torque converter assembly 18 and transmit power directly to the transmission 12 without any efficiency losses associated with operation of the hydraulic fluid 13.

With continuing reference to FIG. 2, the front cover 32 operates in conjunction with an annular driven plate extension 54 (also referred to herein as "damper tang") to sandwich therebetween the TCC 28 and torsional damper assembly 30. The damper tang 54 is attached or joined at a base portion thereof, e.g., by way of turbine hub 49 and rivet 47, to the turbine shell 39, and functions to mechanically engage with, and thereby actuate the individual SMS 44. The damper tang 54 includes a plurality of individual flange portions, designated as 55 in FIG. 2, each extending axially into a respective seat portion of the damper flange 42. As the TC lockup clutch 28 is engaged (i.e., the friction material/surface 48 on clutch plate 52 is urged against contact surface 45 of front cover 32 through operation of the hydraulic fluid 13) and begins to transmit torque (i.e., gain torque capacity independent of the turbine 24), the torsional damper assembly 30 is rotated about its central axis. As a result of this rotational motion, a spring retainer of each SMS 44 is pressed against a respective flange portion 55 of the damper tang 54, thereby compressing the springs 56. This interaction can be used to absorb and dampen unwanted torsionals produced by the engine 14 during normal, startup, and shutdown operations, as some non-limiting examples.

In the illustrated example, the engine flexplate 34 is composed of a disk-shaped flexplate body 57 having a forward-facing "fore" side (e.g., pointing to the right in FIG. 2 towards the engine 14) opposite a rearward-facing "aft" side (e.g., pointing to the left in FIG. 2 towards the transmission 12). An integral central hub 59 of the flexplate body 57 rigidly attaches on the fore side thereof to the engine output shaft 15 for common rotation therewith. As shown, the central hub 59 is formed with circumferentially spaced bolt holes 61; each hole 61 receives therethrough a respective flexplate bolt (not shown) that threadably mates with a complementary internally threaded female hole 63 in the engine hub 33 to thereby rigidly couple the engine flexplate 34 to the engine output shaft 15. It is desirable, for at least some embodiments, that the flexplate body 57 be fabricated from a sufficiently elastic metallic material that allows the flexplate 34 to bend across its central axis to take up motion between the engine 14 and torque converter 18 as rotational speeds change. Projecting radially outward from an outer diameter (OD) edge of the flexplate body 57 is a series of gear teeth 62—collectively defining a "starter ring gear"—that operatively engages with gear teeth 65 of an engine starter.

Packaged between the engine flexplate 34 and the torque converter assembly 18—positioned on the aft side of the disk-shaped body 57—is an engine disconnect device for operatively disengaging the hydrokinetic torque converter 18 from the internal combustion engine 14. By way of non-limiting example, this disconnect device can take on a variety of different mechanical diode configurations that are designed for high lock-up torque along with virtually wear-free overrunning operation. While it may be preferable, for at least some embodiments, that the disconnect device comprise a passively actuated (passive) clutching mechanism, it is also envisioned that the device take on selectively actuated (active) clutching mechanism configurations. In accord with the example illustrated in FIG. 2, the disconnect device is a passive one-way clutch (OWC) mechanism 60 that is directly coupled to both the TC housing front cover 32 and the engine flexplate 34. To utilize existing packaging space within the powertrain envelope, the OWC 60 can be sandwiched between ICE 14 and torque converter 18, nested within a pocket cooperatively defined by the TC housing and flexplate. With this architecture, the OWC 60 is placed upstream from the power transmission 12 and torque converter 18, in series power-flow communication with the ICE 14.

OWC 60 disconnect device functions to automatically operatively connect (or "lock") the crankshaft 15 and hub 33 to the TC front cover 32 and, thus, impeller shell 31 when a speed ratio therebetween is at or above a preset threshold speed ratio (e.g., positive torque is being transferred at approximately 0.98:1.00). Conversely, the OWC 60 functions to automatically operatively disconnect (or "overrun") the crankshaft 15 from the impeller 22 when the speed ratio therebetween is below the aforementioned preset threshold speed ratio and/or when the torque reverses direction. In the example illustrated in FIG. 2, the OWC 60 includes concentric inner and outer annular races 64 and 66, respectively. The inner race 64 is shown integrally formed with, but may otherwise be rigidly attached to, the front cover 32 of the TC housing for common rotation therewith. Conversely, the outer race 66 is shown integrally formed with, but may otherwise be rigidly attached to, the disk-shaped body 57 for common rotation therewith. Disposed between and rotatably coupling the inner and outer races 64, 66 of the OWC 60 is a plurality of circumferentially spaced rollers 68. These rollers 68 can be spring-biased, e.g., via individual helical springs (not shown), to allow overrunning rotational motion of the outer race 66 relative to the inner race 64 in a first direction, but locks the two races 64, 66 to prevent rotational motion in the opposite direction. Alternative configurations may incorporate sprags, ratchet teeth-and-pawl elements, spring-biased rollers, etc., instead of or in addition to the rollers 66. Another optional one-way clutch configuration, designated generally at 60A in the inset view of FIG. 2, may integrally form or otherwise rigidly attach the inner race 64 of the OWC 60A with the disk-shaped body 57, and integrally form or otherwise rigidly attach the outer race 66 of the OWC 60A with the TC front cover 32, as seen in the inset view of FIG. 2. As known in the art, the front cover 32 may also be referred to herein as a "pump cover."

FIG. 3 provides a cross-sectional illustration of the torque converter assembly 18 of FIG. 1 showing a flexplate assembly 134 with an alternative integrated engine disconnect device packaged between engine 14 and torque converter assembly 18. In accord with the example illustrated in FIG. 3, the disconnect device is a selectively actuated (active) selectable one-way clutch (SOWC) 160 that is directly coupled to both the TC housing front cover 132 and the engine flexplate 134. For at least some embodiments, the SOWC 160 is a multi-mode electrically actuated clutching mechanism. Like the OWC 60 of FIG. 2, the SOWC 160 of FIG. 3 includes concentric inner and outer annular races 164 and 166, respectively. The inner race 164 is shown integrally formed with, but may otherwise be rigidly attached to, the front cover 132 of the TC housing for common rotation therewith. Conversely, the outer race 166 is shown integrally formed with, but may otherwise be rigidly attached to, the disk-shaped body 157 for common rotation therewith.

SOWC 160 of FIG. 3 is provided with a series of circumferentially spaced pawls 168 interposed between the inner and outer races 164, 166. These pawls 168 are selectively movable from an engaged position, whereat the pawls 168 lock together the inner and outer races 164, 166, to a disengage position, whereat the pawls 168 allow the races 164, 166 to overrun and thereby disconnect the engine output shaft 15 from the front cover 132. By way of non-limiting example, the SOWC 160 includes an electromechanical solenoid 170 with a wrap spring 172. When an electric current is applied to the solenoid 170, the wrap spring 172 constricts, moving the pawls 168 to the engaged position to thereby lock together the inner and outer races 164, 166. For at least some embodiments, each of the pawls 168 is seated in a respective one of a plurality of pockets 174 formed in the inner and/or outer race 164, 166. Each pocket 174 is cut or otherwise elongated in the axial direction (e.g., left-to-right in FIG. 2) to allow axial movement of the respective pawl 168. This configuration allows the SOWC 160, namely pawls 168, to take up any ballooning motion of the TC housing during operation of the torque converter 18. Optional configurations can employ hydraulically driven solenoids or other means of selective actuation.

FIGS. 4A and 4B present a method or methods of operating the OWC 60 of FIG. 2 or the SOWC 160 of FIG. 3. During a normal operating mode, the disconnect device transfers torque from the engine 14 to the torque converter 18. The OWC of the disconnect device overruns, for example, during an engine shut-off operation. When engine braking is requested, the disconnect device is switched/switches to Lock-Lock mode to allow the transfer of torque between the final drive and the engine. For an engage-lock mode operation, for example, the method 400 starts at block 401 by generating an ENGINE BRAKING COMMAND ON (manual shift) signal. The method 400 continues to block 403 to determine if the disconnect device is overrunning. If the disconnect device is overrunning (403=YES), the method 400 continues to block 405 to synchronize the device (clutch) speed. If the disconnect device is not overrunning (403=NO), the method 400 continues to block 407 to engage Lock-Lock mode.

If the system desires to transition back to normal operating mode, Lock-Lock mode is switched off and, if the engine is in braking mode, engine speed must be increased to properly disengage. For a disengage-lock mode operation, for example, the method 400 starts at block 409 by generating an ENGINE BRAKING COMMAND OFF signal. The method 400 continues to block 411 to determine if the disconnect device (clutch) is loaded for engine braking. If the disconnect device is loaded (411=YES), the method 400 continues to block 413 to apply a positive torque. If the disconnect device is not loaded (411=NO), the method 400 continues to block 415 to disengage Lock-Lock mode.

While aspects of the present disclosure have been described in detail with reference to the illustrated embodiments, those skilled in the art will recognize that many changes may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. An engine flexplate assembly for operatively coupling an engine to a hydrokinetic torque converter of a motor vehicle, the engine having an engine output shaft, and the torque converter having a torque converter (TC) housing with a pump cover, the engine flexplate assembly comprising:

a disk-shaped body with opposing first and second sides and a central hub, the central hub being configured to rigidly attach on the first side thereof to the engine output shaft for common rotation therewith; and a disconnect device positioned on the second side of the disk-shaped body and including concentric inner and outer races, the outer race being integrally formed with or rigidly attached to the disk-shaped body for common rotation therewith, and the inner race being configured to integrally form with or rigidly attach to the pump cover of the TC housing for common rotation therewith, wherein the disconnect device is configured to operatively disconnect the engine output shaft from the pump cover of the TC housing when a torque transmitted therebetween reverses direction.

2. The engine flexplate assembly of claim 1, wherein the disconnect device is a passively actuated clutching mechanism or a selectively actuated clutching mechanism.

3. The engine flexplate assembly of claim 2, wherein the disconnect device is a selectable one-way clutch (SOWC).

4. The engine flexplate assembly of claim 3, wherein the SOWC is a multi-mode electrically actuated SOWC.

5. The engine flexplate assembly of claim 4, wherein the SOWC includes an electro-mechanical solenoid with a wrap spring configured to selectively constrict to move a pawl of the SOWC from a disengaged position to an engaged position and thereby lock together the inner and outer races.

6. The engine flexplate assembly of claim 3, wherein the SOWC includes a plurality of pawls interposed between the inner and outer races, the pawls being selectively movable from engaged to disengaged positions to thereby disconnect the engine output shaft from the pump cover.

7. The engine flexplate assembly of claim 6, wherein each of the pawls is seated in a respective one of a plurality of pockets formed in the inner or outer race, each of the pockets being cut in an axial direction to allow axial movement of the respective pawl to thereby take up a ballooning motion of the TC housing.

8. The engine flexplate assembly of claim 2, wherein the disconnect device is a passive one-way clutch (OWC).

9. The engine flexplate assembly of claim 8, wherein the OWC includes a plurality of rollers rotatably coupling the inner race to the outer race.

10. The engine flexplate assembly of claim 1, wherein the outer race is integrally formed with the disk-shaped body and the inner race is integrally formed with the pump cover of the TC housing.

11. The engine flexplate assembly of claim 1, wherein the central hub of the disk-shaped body includes a plurality of circumferentially spaced holes, each of the holes being configured to receive therethrough a respective bolt to thereby rigidly attach the engine flexplate assembly to the engine output shaft.

12. The engine flexplate assembly of claim 1, further comprising a series of gear teeth projecting from an outer diameter (OD) edge of the disk-shaped body, the gear teeth being configured to operatively engage with a gear of an engine starter.

13. A motor vehicle, comprising:
an internal combustion engine with an engine output shaft rigidly connected to an engine hub for common rotation therewith;
a multi-speed power transmission having a transmission input shaft;
a torque converter assembly operatively connecting the engine output shaft with the transmission input shaft, the torque converter assembly having a torque converter (TC) housing with a pump cover connected to a pump shell to cooperatively define an internal fluid chamber within which are disposed turbine blades and impeller blades;
an engine flexplate assembly including a disk-shaped body with opposing first and second sides and a central hub, the central hub being rigidly attached on the first side thereof to the engine hub for common rotation with the engine output shaft; and
a disconnect device interposed between the engine flexplate assembly and the torque converter assembly, the disconnect device including concentric inner and outer annular races, the outer annular race being integrally formed with or rigidly coupled to the disk-shaped body of the engine flexplate assembly for common rotation therewith, and the inner annular race being integrally formed with or rigidly coupled to the pump cover of the TC housing for common rotation therewith,
wherein the disconnect device is configured to operatively connect the engine output shaft to the pump cover of the TC housing when torque is being transferred therebetween in a first direction, and further configured to disconnect the engine output shaft from the pump cover of the TC housing when the torque reverses to a second direction.

14. A method of constructing an engine flexplate assembly for operatively coupling an engine to a hydrokinetic torque converter of a motor vehicle, the engine having an engine output shaft, and the torque converter having a torque converter (TC) housing with a pump cover, the method comprising:
forming a disk-shaped body with opposing first and second sides and a central hub, the central hub being configured to attach on the first side thereof to the engine output shaft for common rotation therewith;
positioning a disconnect device on the second side of the disk-shaped body, the disconnect device including concentric inner and outer races, the inner race being configured to attach to the pump cover of the TC housing for common rotation therewith; and
integrally forming or rigidly attaching the outer race to the disk-shaped body for common rotation therewith,
wherein the disconnect device is configured to operatively disconnect the engine output shaft from the pump cover of the TC housing when a torque transmitted therebetween reverses direction.

15. The method of claim 14, wherein the disconnect device is a selectable one-way clutch (SOWC).

16. The method of claim 15, wherein the SOWC is a multi-mode electrically actuated SOWC.

17. The method of claim 16, wherein the SOWC includes an electro-mechanical solenoid with a wrap spring configured to selectively constrict to thereby lock together the inner and outer races.

18. The method of claim 14, wherein the disconnect device is a passive one-way clutch (OWC).

19. The method of claim 18, wherein the OWC includes a plurality of rollers rotatably coupling the inner race to the outer race.

20. The method of claim 18, wherein the inner race is integrally formed with or rigidly attached to the pump cover of the TC housing.

* * * * *